United States Patent

[11] 3,549,906

| [72] | Inventors | Melbourne J. Hellstrom<br>Severna Park;<br>Michael H. Oppenheimer, Baltimore, Md. |
|---|---|---|
| [21] | Appl. No. | 686,911 |
| [22] | Filed | Nov. 30, 1967 |
| [45] | Patented | Dec. 22, 1970 |
| [73] | Assignee | Westinghouse Electric Corporation<br>Pittsburgh, Pa.<br>a corporation of Pennsylvania |

[54] CONTROL CIRCUIT RESPONSIVE TO POSITIVE OR NEGATIVE TRANSIENT SIGNAL OR TO POWER SUPPLY VOLTAGE DECREASE TO FIRE SCR
8 Claims, 1 Drawing Fig.

[52] U.S. Cl. .................................................. 307/252,
307/236, 307/246, 307/255, 307/262
[51] Int. Cl. ........................................................ H03k 17/56
[50] Field of Search............................................ 307/236,
235, 246, 255, 252, 264, 262, 296, 305; 328/118;
317/31, 33

[56] References Cited
UNITED STATES PATENTS

| 3,160,766 | 12/1964 | Reymond ..................... | 307/255 |
| 3,317,747 | 5/1967 | Bryant ......................... | 307/235 |
| 3,405,284 | 10/1968 | Chowdhuri ................... | 307/235 |
| 3,457,560 | 7/1969 | Mc Kinley .................... | 307/235 |

OTHER REFERENCES
PUBl " AC MOTOR SPEED CONTROL" IN HOME APPLIANCE BUILDER by MUNGENAST AND DOWLING, dated August 1964, pages 13, 14, 15 and 38.

*Primary Examiner*—Stanley D. Miller, Jr.
*Attorneys*—F. H. Henson, E. P. Klipfel and D. Schron ABSTRACT: A silicon controlled rectifier (SCR) controls the application of power to a load. The SCR is triggered on by means of various input circuits one of which will trigger the SCR upon the application of a positive transient input signal, another one of which will trigger the SCR upon the application of a negative transient input signal, and a third of which will trigger the SCR in response to a decrease in the supply voltage below a predetermined level.

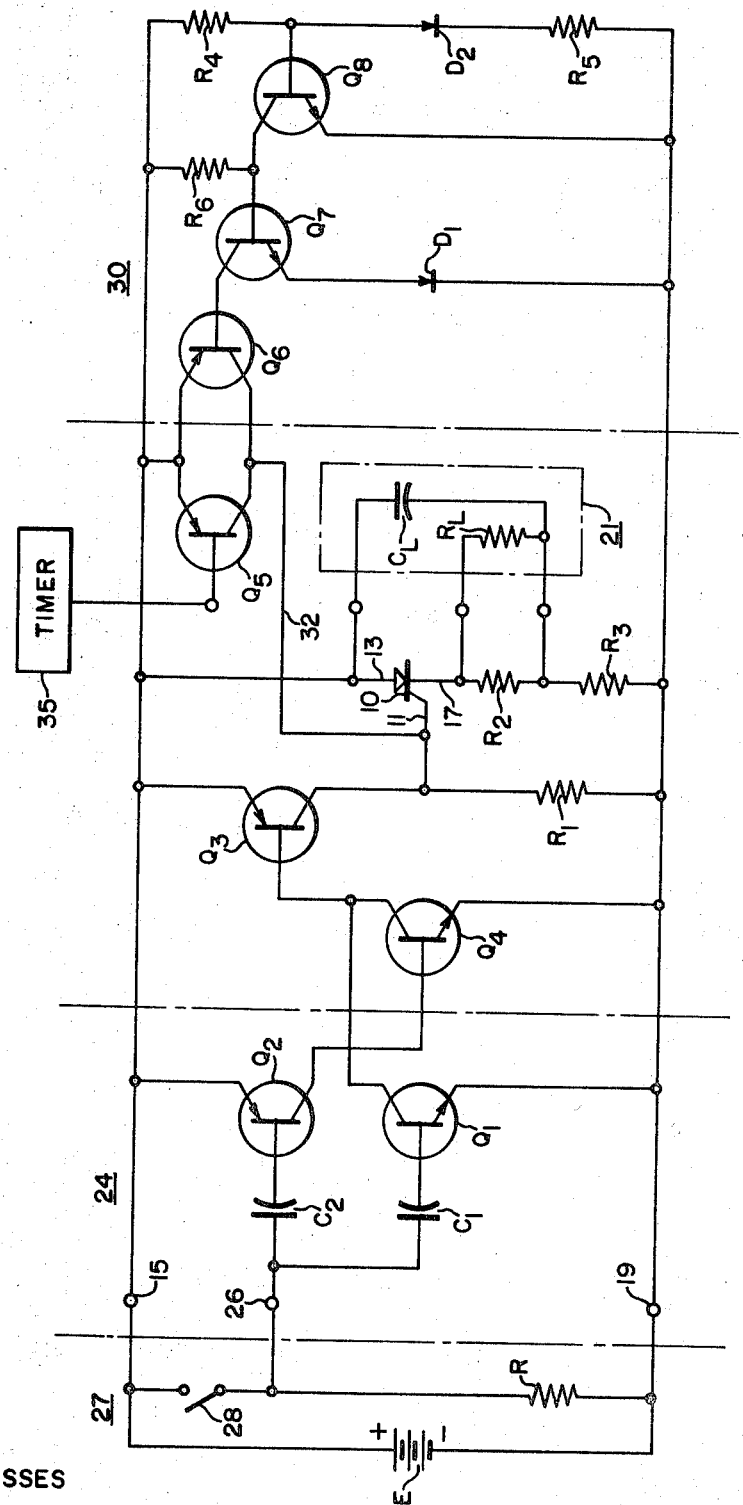

3,549,906

CONTROL CIRCUIT RESPONSIVE TO POSITIVE OR NEGATIVE TRANSIENT SIGNAL OR TO POWER SUPPLY VOLTAGE DECREASE TO FIRE SCR

BACKGROUND OF THE INVENTION

The invention generally relates to control circuits, and in particular to a controlled rectifier device and associated firing circuitry.

SUMMARY OF THE INVENTION

A control circuit includes a semiconductor switch means having an input terminal and operable to activate in response to an input firing signal exceeding a predetermined threshold. A circuit element is provided for developing a firing signal in response to an applied signal.

A plurality of independently operable circuits provide respective output signals to the circuit element when respective input signals representing prescribed events, are present.

BRIEF DESCRIPTION OF THE DRAWING

The drawing illustrates, in circuit component form, a preferred embodiment of the present invention.

DESCRIPTION OF THE PREFERRED EMBODIMENT

In the FIG. there is illustrated a semiconductor switch means in the form of SCR 10 including an input or control electrode 11 to which is applied firing signals for activating the SCR 10. The firing voltage signal which is applied to the input electrode 11 is developed across a circuit element in the form of resistor $R_1$.

The anode electrode 13 of the SCR is connected to a bias terminal means 15 to which is applied a source of operating potential E. The cathode electrode 17 of the SCR is connected through resistances $R_2$, $R_L$ and $R_3$ to a reference potential illustrated as ground 19.

The SCR 10 is operable to control a load circuit of which load circuit 21 is exemplary. The load circuit 21 includes a load $R_L$ and an energy storage device in the form of capacitor $C_L$, which in conjunction with resistor $R_3$ forms a charging path whereby the capacitor $C_L$ charges up to the operating potential E. If the voltage across resistor $R_1$ is such that the firing threshold of the SCR 10 is exceeded, an extremely low impedance will be presented between the anode and the cathode electrodes 13 and 17 such that the capacitor $C_L$ discharges through the SCR 10 and through the load $R_L$.

Activation of the SCR 10 will be in response to a plurality of predetermined input conditions. Two of the conditions are that the SCR 10 fire in response to a positive going input signal and another condition is that the SCR 10 fire in response to a negative going input signal. In order to satisfy these two conditions there is provided an input stage 24 having a first section including capacitor $C_1$ and NPN transistor $Q_1$, and a second section including capacitor $C_2$ and PNP transistor $Q_2$. Application of positive going or negative going signals to input terminal 26 is for example accomplished by means of input circuit 27 including switch 28 in conjunction with the operating potential E and resistor R. By way of example, if switch 28 is closed, from its open position, the voltage at input terminal 26 rises from ground potential to the operating potential E. The resulting positive going pulse is coupled through capacitor $C_1$ to the base electrode of transistor $Q_1$ to turn on the transistor $Q_1$. Means are provided for coupling the collector signal of transistor $Q_1$ to resistor $R_1$, which means takes the form of a transistor $Q_3$ which turns on in response to transistor $Q_1$ turning on, thereby providing a surge of current to resistor $R_1$ to activate the SCR 10.

If the switch 28 is initially in a closed position and is then opened, conditions are such that prior to the opening, capacitor $C_2$ has on it very little charge since its electrodes are at or near the operating potential E and after opening, the capacitor $C_2$ charges through R to ground. The resulting negative going signal applied to the base electrode of transistor $Q_2$ causes transistor $Q_2$ to turn on and provide a signal to transistor $Q_4$ to place it into an on condition. When transistor $Q_4$ turns on, it causes base current in transistor $Q_3$ such that it will turn on and provide a surge of current from its collector to the resistor $R_1$ to activate the SCR 10. It is therefore seen that the input stage 24 provides output signals, one at the collector of $Q_1$ and the other at the collector of $Q_2$, in response to positive going and negative going input signals applied at input terminal 26. The output signals of the input stage are coupled by circuit means including transistors $Q_4$ and $Q_3$ to resistor $R_1$ for developing an input firing signal for the SCR 10.

Another condition for the firing of the SCR 10 is if the operating potential E falls below a predetermined level and accordingly, a low voltage detection stage 30 is provided for accomplishing the desired objective. By way of example, the low voltage detection circuit 30 is seen to include transistors $Q_6$, $Q_7$ and $Q_8$ with the base of transistor $Q_8$ being connected to the junction of the voltage divider resistors $R_4$ and $R_5$ of a biasing means for maintaining transistor $Q_8$ in a conducting condition as long as the operating potential is above a predetermined voltage level. Included in series with resistor $R_5$ is a diode $D_2$ chosen to have similar temperature dependence as the base emitter diode of transistor $Q_8$. Resistors $R_4$ and $R_5$ are chosen to have substantially the same temperature coefficient.

With the operating potential E greater than a prescribed level, transistor $Q_8$ is on, a current flow is established through its collector resistor $R_6$, through the transistor $Q_8$ to ground and the potential at the collector electrode thereof is insufficient to place the transistor $Q_7$ into a conducting state of operation. If the supply voltage decreases to a predetermined level determined by the ratio of resistances $R_4$ to $R_5$, the voltage drop across diode $D_2$, and the emitter-base characteristic of transistor $Q_8$, transistor $Q_8$, in response to the decreasing voltage, will come out of a saturated condition and the voltage at its collector will rise to thereby place transistor $Q_7$ into a conducting condition which in turn places transistor $Q_6$ into a conducting condition such that a circuit means in the form of a direct ohmic connection 32 couples the output signal of the low voltage detection circuit 30 to the resistor $R_1$ to thereby fire the SCR 10.

Since some operating characteristics of semiconductor devices vary with changing temperatures, the diode $D_2$ is placed in the circuit to offset the varying base-emitter voltage changes of transistor $Q_8$ in order that the predetermined voltage level at which the low voltage detection circuit operates, is maintained substantially at a constant value as temperature changes.

Diode $D_1$ is inserted in the emitter circuit of transistor $Q_7$ in order to gain more control in that a higher voltage is necessary to activate the transistor $Q_7$ so that activation does not occur as soon as transistor $Q_8$ comes out of saturation. The threshold is therefore less dependent on the saturation characteristics of $Q_8$ and this lessens the change with temperature of the supply voltage at which the output is activated.

As a fourth input condition, it is sometimes desirable that the SCR 10 fire after a predetermined time during duration. To this end there is provided a timer means 35 operable to supply a timing signal to transistor $Q_5$ to maintain it in an off condition. Such timer means 35 may take the form of an electronic, a mechanical, an electromechanical or an electrochemical device. After the said predetermined time duration a signal will be provided to the transistor $Q_5$ to turn it on such that the circuit means in the form of the direct ohmic connection 32 is a conducting medium for the output signal of transistor $Q_5$ to activate the SCR 10 by means of the resulting firing signal developed across resistor $R_1$.

Although the present invention has been described with a certain degree of particularity, it should be understood that the present disclosure has been made by way of example and that modifications and variations of the present invention are made possible in the light of the above teachings.

I claim:

1. A control circuit comprising:

a. semiconductor switch means including an input terminal and operable to activate in response to an input firing signal exceeding a predetermined threshold;
b. a circuit element for developing a firing signal in response to an applied signal, and being operably connected to said input terminal;
c. an input stage including:
 1. a first section for providing a first output signal only in response to a positive going input signal, and including an NPN transistor, and a first capacitor for coupling an input signal to the base electrode of said NPN transistor, and
 2. a second section for providing a second output signal only in response to a negative going input signal, and including a PNP transistor, and a second capacitor for coupling an input signal to the base electrode of said PNP transistor, only one of said transistors being conductive upon the application of an input signal;
d. first circuit means for coupling said output signals to said circuit element;
e. bias terminal means for connection to a source of operating potential;
f. a low voltage detection stage connected to said bias terminal means and operable to provide a third output signal when the operating potential falls below a predetermined level; and
g. second circuit means for coupling said third output signal to said circuit element.

2. A control circuit according to claim 1 which includes:
a. an input terminal connected to both the first and second capacitors;
b. an input circuit including:
 1. a source of potential,
 2. resistance means, and
 3. a switch means for opening and closing said input circuit; and
c. said input terminal being connected to said input circuit.

3. A control circuit according to claim 1 wherein:
a. the semiconductor switch means is a controlled rectifier device; and
b. the circuit element is a resistor.

4. A control circuit according to claim 1 wherein:
a. the low voltage detection stage includes:
 1. first transistor means,
 2. biasing means for maintaining said first transistor means in a conducting condition as long as the operating potential is above a predetermined voltage level,
 3. second transistor means responsive to said first transistor means for remaining in a nonconducting condition when said first transistor means is in said conducting condition and for being placed into a conducting condition in response to said first transistor means switching to a nonconducting condition; and
 4. means responsive to the condition of said second transistor means for providing the third output signal.

5. A control circuit according to claim 4 wherein:
a. the biasing means includes:
 1. at least a first resistor connected between the bias terminal means and the input to the first transistor means, and
 2. at least a second resistor connected between the input to the first transistor means and a point of reference potential.

6 A control circuit according to claim 5 which additionally includes diode means in series circuit relationship with the second resistor.

7. A control circuit according to claim 5 wherein:
a. the first and second resistors have substantially the same temperature coefficient.

8. A control circuit according to claim 1 which additionally includes a timing circuit for applying a fourth output signal to the circuit element after a predetermined time duration.